W. HENIGST.
Grain-Drills.
No. 157,072. Patented Nov. 24, 1874.
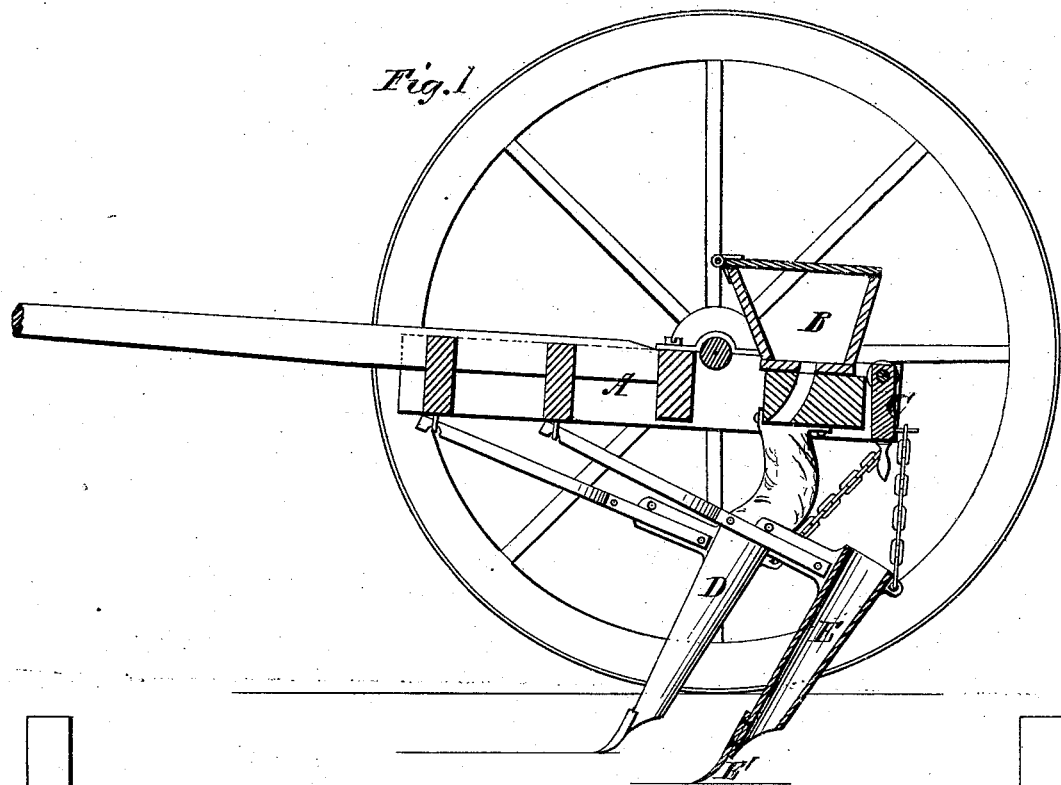
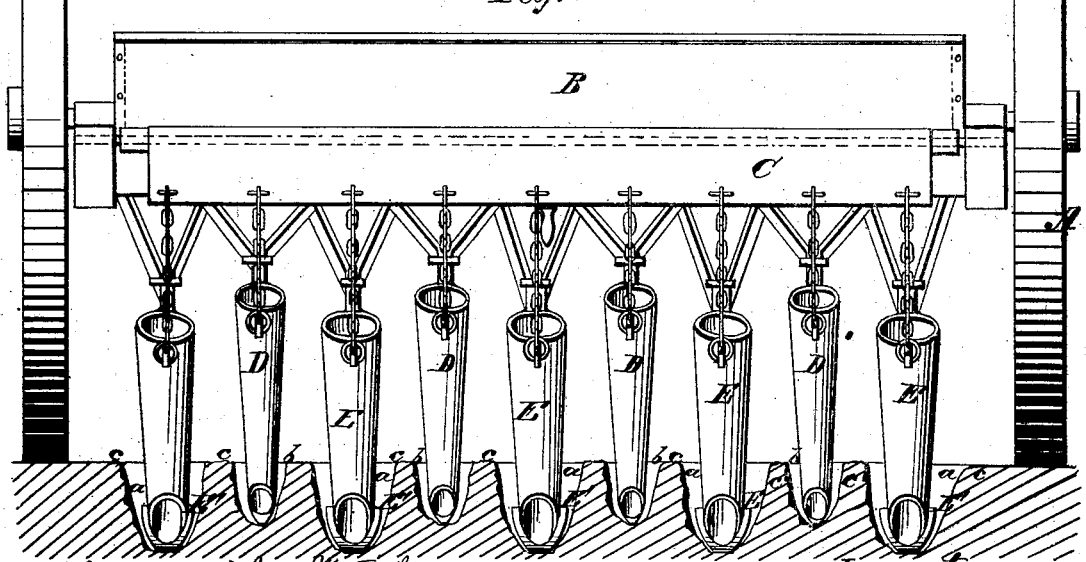

UNITED STATES PATENT OFFICE.

WILLIAM HENIGST, OF COLUMBUS, OHIO.

IMPROVEMENT IN GRAIN-DRILLS.

Specification forming part of Letters Patent No. 157,072, dated November 24, 1874; application filed August 8, 1874.

*To all whom it may concern:*

Be it known that I, WILLIAM HENIGST, of Columbus, in the county of Franklin and State of Ohio, have invented a new and useful Improvement in Grain-Drills; and I do hereby declare the following to be a full, clear, and exact description thereof, reference being had to the accompanying drawings making part of this specification, in which—

Figure 1 is a longitudinal section of a grain-drill having my improvement applied to it. Fig. 2 is a rear elevation of the same.

The nature of my invention consists in the combination, with the drill-tubes and their lifting-bar, of a series of shovel-standards having shovels on their lower ends and set out of line with and in rear of the tubes, and to run at a depth deeper than the same, whereby the grain is planted and covered and a deep furrow formed between the rows for receiving the water and conducting it away from the growing grain; and whereby, further, fertilizing material may be conducted by the standards of the shovels, if made tubular, from a box behind the grain-hopper, and thus land fertilized near the place where the grain is planted.

By my invention the wheat will be on dry ground, for the water will drain or deposit in the furrows between, and thus liability of the wheat freezing out or being injured by standing water in spring will be prevented, and, consequently, a better crop secured.

My drill, as constructed, will sow the wheat rows at from eighteen to twenty inches apart, and thus tilling in spring is rendered practicable without injury to the growing grain. This manner of sowing and cultivating requires less seed to the acre, and still produces a larger crop.

To enable others skilled in the art to understand my invention, I will proceed to describe it.

A represents an ordinary grain-drill car-carriage, having an ordinary distributing-hopper, B, and lifting-bar C. D D are the drill-tubes, set farther apart than usual, but constructed and arranged in the ordinary manner upon the frame A, and linked to the lifting-bar C, so as to be raised and lowered by the same. E E are tubular standards, to which the covering-shovels E' are attached. On the outside of the row of drill-tubes, and a little in rear of the same, and also between the drill-tubes, the standards E E are placed and hung to the frame and to the lifting-bar in the same manner as the drill-tubes are hung to the frame and attached to the bar. The standards E are of a greater diameter than the drill-tubes, and the shovels on the ends of the same are of much greater width than the points on the drill-tubes, in order that a larger furrow may be made and the fertilizing material may pass down freely through them into the furrow.

In the drawings I have not shown the hopper for the fertilizing material; but it is obvious that it can be placed upon the frame behind the hopper and operated simultaneously with the seed-distributing slide.

In the drawing, Fig. 2, I have illustrated the way in which the ground is operated upon by the drilling-machine passing over it, *a* showing the water furrows, *b* the grain furrows, and *c* the ridges between the two sets of furrows.

The shovels might have solid standards, but I prefer the tubular standards, as they conduct the fertilizing material to the ground.

It will be observed that the shovels and the grain-tubes are raised and lowered by the bar C.

I am aware that ridged fluted rollers have been placed behind drills for the purpose of covering the wheat and forming furrows between the rows of grain, and therefore I do not claim that plan as my invention;

What I do claim is—

The combination, with the tubes D D of an ordinary grain-drill, and with their lifting-bar C, of the shovel-standards E, having shovels E' on their lower ends, and arranged to run deeper than the drill-tubes and a little in rear of the same, substantially in the manner described and shown.

WILLIAM HENIGST.

Witnesses:
T. J. DUNCAN,
W. F. WALLACE.